March 14, 1972 A. F. LEWIS ET AL 3,649,430
VIBRATION DAMPING LAMINATES
Filed Oct. 21, 1965

5% OPEN AREA
0.0625" DIA.

22% OPEN AREA
0.041" DIA.

30% OPEN AREA
0.066" DIA.

63% OPEN AREA
0.156" DIA.

46% OPEN AREA
0.281" DIA.

43% OPEN AREA
0.312" DIA.
0.128" DIA.

60% OPEN AREA

76% OPEN AREA

29% OPEN AREA

INVENTORS.
ARMAND FRANCIS LEWIS
GERALD BRENT ELDER
BY
*Frank M. Van Riet*

ATTORNEY

United States Patent Office 3,649,430
Patented Mar. 14, 1972

3,649,430
VIBRATION DAMPING LAMINATES
Armand Francis Lewis, Fairfield, and Gerald Brent Elder, Stamford, Conn., assignors to American Cyanamid Company, Stamford, Conn.
Filed Oct. 21, 1965, Ser. No. 499,389
Int. Cl. B32b 3/10
U.S. Cl. 161—88
4 Claims

ABSTRACT OF THE DISCLOSURE

This invention relates to polymer core metal laminates composed of a polymer material core containing a multiplicity of perforations throughout its planar surface, having bonded thereto with a tough, elastomeric adhesive, at least one layer of a metal.

---

Metal laminates are known in the art and have been the subject of numerous patents. Most laminates are satisfactory for many commercial uses but fail in at least one of three important properties, which are essential for commercial use, i.e. (1) sound and vibration damping, (2) light weight, and (3) formability. That is to say, most commercial metal laminates do not sufficiently (1) dampen sound and mechanical vibration as to allow their usage in, for example, kitchen cabinets, electronic relay chassis, instrument cabinets, base plates for motors, and the like. Additionally, they are generally not (2) light enough in weight to be practical. Expressed technically, present commercial laminates generally have too low a strength to weight ratio to be used in certain applications such as refrigerator doors, aircraft decking and panels, etc. Finally, many commercial metal laminates fail because of their inability to be (3) formed into various shapes without delaminating, i.e. the laminate fails when being deep draw, welded, etc. into the configuration desired by the ultimate consumer.

We have now found that we can produce metal laminates which possess the ability to dampen sound and vibration, are light weight and may be formed into numerous shapes without delaminating. We produce these laminates by bonding a metal outer layer to an inner layer composed of a perforated polymeric material. The use of the perforated core material is the critical feature which creates in these laminates the above-mentioned properties.

By formability, as used herein, is meant that the laminates may be bent, deep-drawn, sawed and fabricated, joined or post-formed etc., by spot-welding, seam-welding, soldering, punching, riveting or tapping utilizing conventional or special equipment and techniques.

As mentioned above, one of the unique features of our metal laminates, is the unusual sound and vibration damping characteristics thereof. Their ability to dampen out acoustical and mechanical vibrations is even more astounding when it is realized that our laminates have sound insulation values 10–25% better than solid metal sheets or solid base laminates. This quality is believed due to the fact that our laminates vibrate at a lower resonance frequency and acoustically there is a sudden drop-off of the noise spectrum at higher frequencies. Our products may be used under cryogenic conditions because no delamination of fabricated structures of the laminate occurs at temperatures as low as —196° C.

It is therefore an object of the present invention to provide perforated polymer core metal laminates.

It is a further object of the present invention to provide polymer core metal laminates composed of at least two layers, one a metal and the other a polymeric material, bonded together with or without an adhesive, the polymeric material constituting the core or base member and being perforated.

It is still a further object of the present invention to provide polymer core metal laminates composed of at least two bonded layers, the outer layer being of a relatively thin cross-sectioned metal and the inner layer being composed of a polymeric material, preferably thicker than said outer layer, and containing a multiplicity of perforations throughout its horizontal planar surface, said layers being bonded together, with or without, an adhesive material.

These and other objects of the present invention will become more apparent to one skilled in the art upon reading the more detailed description set forth hereinbelow.

Our novel laminates, as mentioned briefly above, in their simplest form, are composed of (A) a surface metal which may have a desirable aesthetic appearance, corrosion resistance, mechanical strength and durability, bonded to (B) a polymer material core which is perforated throughout its surface area and through its cross-sectional area.

We may also produce, in a more sophisticated product, a perforated core polymer having a metal layer bonded to both planar surfaces thereof and remain within the scope of the instant invention. Additionally, the laminate may be composed of two or more perforated polymer sheets bonded to each other and having a foil layer of metal bonded to the exterior surfaces of the resultant double core. Various other configurations are also contemplated as within the scope hereof, i.e. laminates of other cores, foils and the like.

British Pat. No. 951,266 teaches a typical commercially available metal laminate over which our novel laminates are an improvement. The laminates of said patent are composed of two or more metal layers, one a base or core and the other a foil, which are bonded together with an adhesive. There is present, therein, however, between said metals and in said adhesive, a sheet of flexible polymeric resin. It is this polymeric sheet which provides the patented laminate with its structural properties.

Our laminates do not contain such a polymeric sheet bonded to each metal layer. We can produce laminates which have properties at least equivalent to, and in most cases better, than those of the product shown in the British patent, without using the extraneous sheet of polymer.

We achieve our excellent results by the use of a combination of a perforated base polymer material, and at least one thin skin metal layer.

The use of such perforated layers results in excellent laminates, any extraneous adhesive portion of which, if utilized, is less than one percent of the total weight of the laminate.

Many types of metals may be utilized to produce the layer or layers of our laminates with stainless steel, carbon steel or aluminum being preferred. Other metals such as zinc, gold, galvanized carbon steel, aluminum coated carbon steel, magnesium, copper, brass, titanium, lead, nickel, silver, nickel alloys and the like may also be utilized.

Generally, any polymeric material may be utilized as the core member of our novel laminates, the specific polymer being selected according to the type of laminate being produced. That is to say, when an adhesive is utilized to bond the metal to the polymer core, any polymer which is compatible with the adhesive may be utilized, however, when no adhesive is being used, the polymer selected must be of such a type which is capable, of itself, of bonding the components together such as by application of heat and/or pressure, those of the latter type being well known.

Examples of useful polymers include olefin polymers such as polyethylene, including high-density polyethylene, polypropylene; polyvinyl halides such as polyvinyl chloride; polyvinylidene halides such as polyvinylidene fluoride; polyethylene glycol terephthalate; "nylon" resins, i.e. adipic acid-polyalkyleneamine reaction products; polycarbonates, i.e. phosgene-polyhydroxyaryl reaction products; polyurethanes, i.e. polyether or polyester based isocyanate reaction products; polyvinyl acetate; polyvinylbutyral; butadiene copolymers; the polystyrene, i.e. polystyrene per se, polymethylstyrene; cellulose polymers such as cellulose acetate; cellulose butyrate; acrylate and methacrylate homopolymers and copolymers such as poly(methyl methacrylate), poly(ethyl acrylate), methyl methacrylate-ethyl acrylate copolymers; the so-called "impact polymers" i.e. rubber-polymer blends such as blends of polystyrene with 5–10% of butadiene-styrene, polyacrylonitrile with 5–27% of butadiene-styrene, methyl methacrylate polymers with 20–50% of grafted polybutadiene; and the like.

The polymeric core material may be used in any form, i.e. solid, foamed, expanded (those wherein air is present therein) etc., as long as the material is perforated, as mentioned above.

The base core polymer layer, must be perforated in order to obtain the advantageous properties already set forth hereinabove.

By "perforated" or "perforation," as used herein, is meant, any sheet of polymer having perforations therein of the nature and type which can be produced by percussion, punching, punch-folding, molding, drilling or casting perforation techniques.

The perforations may be circular, oval, rectangular, diamond or random shaped holes. The size of the perforation used depends upon the intended application. For example, if the laminate is to be used in architectural areas, it is preferred that the hole diameter be not greater than the thickness of the surface layer so that depressions of the surface metal into the holes will not form when bending pressure is applied to the laminate during forming, thereby marring too severely the appearance of the surface layer.

On the other hand, if more favorable strength to weight ratios are sought, larger holes or perforations would be desirable.

While the particular sizes, shapes, etc. of the perforations in the polymer core are not critical, we have found that the open area of the polymer core should range from about 5% to about 95%, of the base metal. Optimum properties of the resultant laminates are achieved with base polymer open areas of from about 15% to about 75%. Some of the useful perforated core types and their corresponding percentage of open area are shown in the accompanying drawing.

In the drawing, FIGS. 1–9 represent various styles and configurations of perforated core polymers which are representative of those useful in producing the laminates of the present invention. The figures show the perforations in their actual sizes as represented by sections measuring, of the most, 1½" x 1½".

Figure 1:
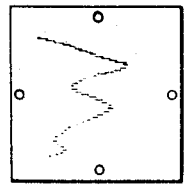
FIG. 1 represents a polymer sheet having a 5% open area and circular perforations 0.0625" in diameter.
Figure 2:
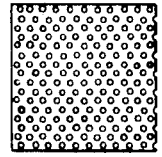
FIG. 2 represents a polymer sheet having a 22% open area and circular perforations 0.041" in diameter.
Figure 3:
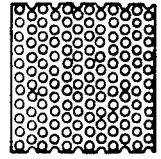
FIG. 3 shows a polymer sheet having a 30% open area and 0.066" diameter circular perforations.
Figure 4:
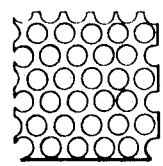
FIG. 4 shows a polymer sheet having a 63% open area and 0.156" diameter circular perforations.
Figure 5:
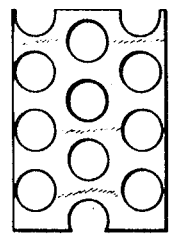
FIG. 5 represents a polymer sheet having a 46% open area and circular perforations of 0.281" diameter.
Figure 6:
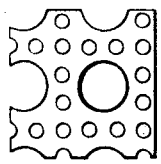
FIG. 6 represents a polymer sheet having a 43% open area as a result of circular perforations of 0.312" and 0.125" in diameter.
Figure 7:
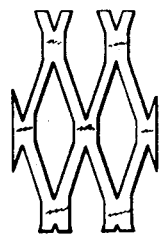
FIGS. 7–9 represent sheets of polymer having 60%, 76% and 29% open area, respectively, as a result of perforations other than circular in shape, i.e. diamonds squares and slots, respectively.
Figure 8:
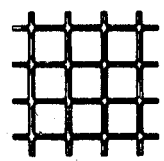
Figure 9:
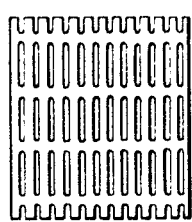

Any of these types of perforated polymer sheets, as well as any other polymer sheet containing perforations of any configuration and size can be utilized to produce our novel laminates.

The perforated core layer of our novel laminates may vary in thickness over a relatively large span. It is generally considered practical, however, to utilize a thickness ranging from about 5 to 1000 mils. The perforated core layer should preferably be at least about twice as thick as the foil, skin or surface metal layer which, practically, ranges in thickness from about 1–100 mils. Cores and skins of the same thickness may, however, be used.

The adhesive layer, when used, should range in thickness from about 0.5 to 4 mils. Thicker layers are unnecessary and sometimes disadvantageous because of the difficulty in fabricating thicker layer laminates without marring or indenting the surface but are not, however, to be excluded if necessary for some particular service application especially wherein a thermally and electrically insulating laminate is desired. A critical limitation in the use of an adhesive is that the adhesive must not fill the perforations in the polymer core. These perforations materially contribute to the properties of the ultimate laminate and if the perforations are filled with adhesive, these properties will be essentially lost. Minor amounts of adhesive in the perforations, may, however, be tolerated.

Generally, any adhesive material may be utilized to form our novel laminates, the adhesive being used, as mentioned above, when the polymer core material is not, of itself, sufficient to bond the metal layer thereto.

Example of adhesives which may be used include polyvinylacetates, and vinyl acetate copolymers, polysulfides and epoxy-polysulfide mixtures, butyl rubber-based adhesives, rubber modified polyethylene/propylene rubbers, and the like. Further examples of useful adhesives include those disclosed and claimed in one or more of the following U.S. Pat. Nos. 2,610,910, 2,400,612, 2,514,427, 2,581,920, 2,673,845, 2,684,351, 2,879,252, 2,918,442, 2,290,990, 2,977,273, which patents are hereby incorporated herein by reference.

In a preferred embodiment the dynamic glass transition temperature of the adhesive should be at the service temperature at which the laminate is to be used or below. While designing a particular adhesive-perforated polymer core-metal skin laminate, the dynamic glass transition frequency of the adhesive at the service temperature of the laminate should be at or above the frequency level to which the laminate will environmentally be subjected. This phenomenon is described more fully in an article by A. F. Lewis et al., Proc. Fourth Int. Congress on Rheol., Part 2, page 505 (1965), which article is hereby incorporated herein by reference.

Among the adhesives which may be used to form the novel laminates of our invention, and are generally preferred, are those specifically set forth and claimed in at least one of the following pending U.S. patent applications: Ser. No. 274,911, filed Apr. 23, 1963, now U.S. Pat. 3,290,208; Ser. No. 296,916 filed July 23, 1963, now abandoned, and Ser. No. 380,914, filed July 7, 1964, now abandoned which applications are hereby incorporated herein by reference.

Briefly, these adhesives are composed of the following ingredients:

(A) a polyurethane resin,
(B) a diamine curing agent, and
(C) a diglycidyl ester, a diglycidyl ether, a monoethylenically unsaturated monoglycidyl ether, or a monoethylenically unsaturated monoglycidyl ester, or
(D) as a substitute for, or in addition to (C), an aminosilane, or
(E) as a substitute for (D) and in addition to (C), an epoxy silane, or
(F) in addition to components (A), (B), (C) and (E), a polyethylenically unsaturated compound.

Among the polyurethane resins which may be utilized to prepare the adhesives preferred herein are the polyester or polyether based resins, although generally, any known polyurethane resin may be used. One class of polyurethane resins useful in preparing the adhesives used herein are the polyalkylene ether, thioether and etherthioether glycols known in the art, which have been reacted with a suitable isocyanate compound. The alkylene compounds may be replaced by alkylene-arylene compounds also well known in the art.

A second class of polyurethane resins useful herein are those prepared from linear polyesters containing a plurality of isocyanate-reactive hydroxyl groups, such as those produced by condensing a polyhydric alcohol with a polycarboxylic acid or anhydride. U.S. Pat. Nos. 2,729,618 and 3,016,346 teach examples of various polyurethanes which may be used as components in the adhesives which may be used herein and also procedures for the production thereof, said patents being incorporated herein by reference.

A polyurethane resin system which has been found to be exceptionally useful is composed of a polyester of adipic acid and ethylene glycol which has been reacted with methylene diphenyl isocyanate. The resultant product is then further reacted with 1,4-butanediol. When polyurethane resins of this type are utilized, no curing agent need be employed.

The polyurethane may need to be cured, however, in order to give the optimum results. If such curing is necessary, curing agents such as 4,4'-diamino-diphenylmethane, 4,4'-methylene-bis-2-orthochloroaniline and the like may be used. Ranges of from 0%–130%, preferably 20%–100%, of the stoichiometric equivalent of the polyurethane should be used.

The diglycidyl ethers or esters and the monoethylenically unsaturated monoglycidyl ethers or esters useful as components of the adhesives used herein include glycidyl methacrylate, glycidyl acrylate, allyl glycidyl ether, diglycidyl phthalate, glycidyl benzyl acrylamide, the diglycidyl ether of 2,2-bis(p-hydroxyphenyl) propane and the like, in amounts ranging from 1:2 parts to about 1:11 parts of the diglycidyl esters or ethers to the polyurethanes, respectively.

In place of the glycidyl esters and ethers, one may use an aminosilane such as gamma-aminopropyl-triethoxysilane, delta-aminobutyldiethoxy silane and the like in concentrations ranging from about 0.1% to about 4.0%, by weight, based on the weight of the polyurethane resin.

Furthermore, if the glycidyl ester or ether is utilized, one may use, in addition thereto, an epoxy silane, such as gamma-glycidoxypropyltrimethoxysilane in amounts ranging from 0.1% to 10.0%, by weight, based on the total weight of the adhesive per se.

An additional component which may be used in combination with the polyurethane resin, the amine curing agent, the glycidyl ester or ether and the epoxy silane, comprises a polyethylenically unsaturated compound such as tetrallyl melamine, trimethylol propanetrimethacrylate divinyl benzene, triallylphosphate, triallylamine, ethylene glycol dimethacrylate, diallylphthalate, 1,4-di(vinyloxy) butane and the like in concentrations of up to about 20%, by weight, based on the total weight of the composition per se.

In an even more preferred embodiment of our invention, we may place a woven member between the skin metal and the perforated polymer on either side thereof, and in the adhesive layer. This woven member further increases the vibration damping characteristics of the laminate and reduces the tendency of the surface metal to depress into the perforations of the polymer core thereby marring the surface of the laminate.

By the term "woven stress-raising member," etc. as used herein and in the appended claims, is meant any material or article of manufacture which is in the form of a fabric or network of cords, ribbons, wires, etc. that cross at regular intervals and may or may not be secured at the crossings, and which, when embedded in the adhesive, raises the local stress in the adhesive and distributes the stress through the adhesive layer. These members may be in the form of a braid, reticulation, mesh, net, sieve, screen, etc. and may be interlaced, intertwined, tangled or otherwise intertwisted.

We have found that the addition of the stress-raising member to the adhesive causes the adhesive to behave differently. While not wishing to be bound by any particular theory, it is believed that the following discussion will, at least, provide one explanation of this phenomenon.

Any sudden discontinuity in a stressed solid will induce stress concentration at that point. The stress concentration factor is dependent on the geometrical configuration of the discontinuity and may range from slightly more than one to a hundred or more.

In a viscoelastic material such as a rubbery adhesive, the energy required to strain the material at low stresses is almost completely recoverable when the stress is removed, i.e. there is no damping of the motion. At higher stress levels, the energy is no longer recoverable and is dissipated in the material, i.e. there is damping.

Discontinuities provided by the woven member, in the adhesive layer of a metal laminate, increase the local stress in the adhesive layer. This places more of the low level stresses, recoverable without this layer, into the nonrecoverable or damping region. At higher amplitudes, the wires distribute the stress over a wide area and stress the adhesive into the damping region. The overall result is a broad range damping metal laminate.

The stress-raising members used herein may be linear or random in configuration. They may contain individual, non-attached, parallel, straight or bent members or contain perpendicular, straight or bent members having the same or a different number of members per inch on each side thereof. The woven members may contain from 1 to 1000 strands preferably 3–100, to the inch and may differ in number in either direction.

The stress raising members may be composed of any material with such materials as metals, natural or synthetic polymers, i.e. poly(vinylidene chloride), poly(acrylonitrile), poly(methyl methacrylate), etc. neoprene-coated paper, glass, asbestos, paper, polymer-coated fiber glass, and the like, being exemplary.

The thickness of the woven stress-raising member is not critical and is governed by design criteria and by the thickness of the adhesive layer, the woven member being somewhat thinner than the adhesive layer so that it is embedded therein.

When an adhesive is used, the laminates of the instant invention are prepared by coating one or both sides of the polymeric core, and one side of the foil metal which are to be bonded together, with the adhesive, being careful not to fill the perforations of the core, curing the adhesive, and placing the metal layer against the polymeric core under pressure to form the laminate. During the curing step, the solvent in the adhesive is evaporated off and the adhesive is then cured. The layers are then pressed together at 50–100 p.s.i. and post-cured. The adhesives may also be utilized as solvent free systems whereby no evaporation step is necessary before curing. Our laminates can be produced both by a continuous method whereby rolls of metal are continually coated with adhesive and fed to evaporation (optional), curing and nipping zones or in a bulk method whereby the layers are individually coated with adhesive, such as by spraying, and subjected to heat and pressure consolidation.

Before applying the adhesive to any metal, the metal should preferably be clean. This may be achieved by treating the metal with hot aqueous alkali or acid solution. The adhesive is preferably used as a 40–60% solution in a solvent such as methyl ethyl ketone and may be applied to the metal by brushing, roller coating, curtain coating, spraying techniques and the like.

When no adhesive is used, the laminates are generally prepared by subjecting the foil and perforated core to a temperature of about 5° C. above the glass transition temperature of the core if it is composed of a non-crystalline polymer and about 5° C. above the crystalline melting point of the core if it is composed of a crystalline polymer. Pressures of from atmospheric to 200 p.s.i. may also be utilized.

Our novel laminates are useful in such applications as architectural devices such as mullions, window tracks, window frames, elevator doors and panels, etc. automotive parts such as trim, dash panels, splash guards, hub caps, household structures such as kitchen panels, sinks, trim, closet doors, door frames and panels, bathroom panels, shower stalls and cabinets, mail boxes, furnace housings, garage doors, industrial articles such as ducts and exhaust hoods, corrosion resistant chambers, building panels, trim, electronic equipment panels and chassis, instrument cabinets, wall plates, vending machines and the like. Military and space applications are also within the realm of applications for these laminates.

The following examples are set forth for purposes of illustration only and are not to be construed as limitations on the present invention. All parts and percentages are by weight unless otherwise indicated.

EXAMPLE 1

To three parts of glycidyl methacrylate are added one part of finely pulverized 3,3'-methylenebis-ortho-chloroaniline and 0.35 part of gamma-glycidoxy-propyltrimethoxysilane in a suitable vessel. The vessel is warmed to 70° C. to dissolve the ingredients and then cooled to room temperature. To the resultant mixture are then added 12 parts of a polyester (90/60 ethyleneglycol/propyleneglycol adipate) based commercially available polyurethane resin (polyester reacted with 3,3'-dimethyl-4,4'-biphenylene diisocyanate) and 0.01 part of 2,5-dimethyl - 2,5 - di-(t-butylperoxy)n-hexane as a catalyst, with stirring. The resultant composition is blended into a smooth paste and is applied to both sides of a 0.0507 inch thick polyethylene sheet, 4 inches in width and 10 inches long, and perforated to a 38% open area with 0.06" circular holes. The same composition is then applied to two similarly dimensioned sheets of aluminum 0.020" in thickness. The three sheets are heated to 100° C. for 1 minute then the two metal sheets are then nipped together hot with the polymer sheet interspaced therebetween, the adhesive sides in contact with said sheet, to produce a laminated structure having a total thickness of 93 mils. The composite is then cured for 20 minutes at 100° C. and 2 hours at 130° C.

The resultant laminate is then subjected to tests in order to obtain the damping properties thereof. Various other laminates are also prepared according to Example 1, except that different metal foils and polymeric core materials are used and in some instances, the adhesive is omitted. These properties of the laminate of Example 1 and those of the prior art and other embodiments of our invention are shown in Table 1, below.

The relative sound transmission loss of the products was evaluated by clamping (10¼" x 10¼") samples in the center of a 10¼" x 10¼" x 8' maple box suspended on flexible tubing supports. A microphone was positioned at the transmitted side quarter point of the box. The noise generator consisted of a speaker mounted in the end plate of the chamber, a random noise generator and an amplifier.

The procedure for each sample involved adjusting the noise generator and amplifier to provide the same input noise level. The broadband difference due to the interference of the sample was then observed and noted.

TABLE I

| Example | Laminate structure | Adhesive [a] | Density, g./cc. | Relative sound transmission loss at 500 cps. | Flexural modulus, p.s.i. ×10⁻⁶ | Flexural yield strength, p.s.i. ×10⁻³ | Modulus/density in ×10⁻⁷ | Yield/density in ×10⁻⁴ | Thermal conductivity, cal./cm. seconds °C. | Damping [b] time, seconds |
|---|---|---|---|---|---|---|---|---|---|---|
| 1 | 20 mil aluminum skins on both sides of perforated [1] 40 mil polyethylene. | Yes | 1.67 | 10.2 | .58 | 4.3 | .96 | 7.1 | .00074 | 2.7 |
| 2 | 20 mil aluminum skins on both sides of perforated [1] 40 mil polyvinyl chloride. | Yes | 1.84 | 8.5 | .61 | 4.9 | .72 | 7.2 | .0018 | 2.6 |
| 3 | 10 mil stainless steel skins on both sides of perforated [1] 40 mil polyvinyl chloride-woven polyvinylidene chloride cloth in adhesive. | Yes | 1.34 | 10.7 | .17 | 1.5 | .35 | 3.1 | .0025 | 0.7 |
| 4 | 10 mil stainless steel skins on both sides of perforated [1] 40 mil polyethylene-woven polyvinylidene chloride cloth in adhesive. | Yes | 1.08 | 8.0 | .17 | 0.94 | .44 | 2.4 | .00043 | <0.5 |
| 5 (comparative) | 20 mil aluminum skins on both sides of solid 125 mil polyethylene. | Yes | 1.38 | 7.0 | .60 | 3.0 | 1.2 | 6.0 | .0092 | 3.1 |
| 6 (comparative) | 20 mil aluminum skins on both sides of solid 30 mil polyethylene. | Yes | 1.55 | 8.0 | .68 | 8.1 | 1.3 | 15.0 | .0015 | 3.6 |
| 7 | 10 mil stainless steel skins on both sides of perforated [1] 30 mil polyethylene. | No [2] | 1.38 | 9.0 | 1.03 | 11.4 | 2.2 | 23.8 | .0013 | 0.8 |
| 8 (comparative) | 20 mil aluminum skins on both sides of solid 30 mil polyethylene. | No [2] | 1.56 | 8.0 | | | | | .0024 | 3.9 |
| 9 | 15 mil brass skin on one side of perforated [3] 50 mil poly(methyl methacrylate). | Yes | 2.53 | 7.5 | | | | | .0030 | 2.7 |
| 10 | 50 mil bronze skin on one side of perforated [4] 20 mil impact polybutadiene/methyl methacrylate-graft polymer. | Yes [c] | 7.04 | 13.0 | | | | | .0055 | 2.7 |
| 11 | 10 mil titanium skin on one side and 10 mil magnesium skin on other side of 250 mil perforated [5] nylon.[6] | No [2] | 2.01 | 10.5 | | | | | .00091 | <0.5 |
| 12 | 25 mil copper skin on one side of 50 mil perforated [7] cellulose acetate butyrate-woven copper screen (10 strands per inch) in adhesive. | Yes [d] | 3.13 | 8.0 | | | | | .00035 | <0.5 |
| 13 | 5 mil stainless steel skins on both sides of 100 mil perforated [1] polyethylene glycol terephthalate-isoprene rubber coated woven paper (4 strands per inch) in adhesive. | Yes | 0.96 | 9.3 | | | | | .002 | <0.5 |
| 14 | 20 mil aluminum skins on both sides of 1000 mil perforated [1] polyurethane foam. | Yes | 0.17 | 10.6 | | | | | .0007 | 2.9 |

[1] 0.06" circular perforations—38% open area.
[2] Polymer heated to softening point; skins applied; components consolidated by pressure.
[3] .080" (short dia.) diamond shaped perforations—60% open area.
[4] .066" (short dia.) oval shaped perforations—30% open area.
[5] 0.312 and 0.125" circular perforations—43% open area.
[6] Adipic acid-hexamethylenediamine reaction product.
[7] .0625" square perforations—5% open area.
[a] If same as Ex. 1, no specific designation given.
[b] Time in free vibration for a fixed end cantilever, beam ½" x 9⅛", initially deflected 1", to damp the amplitude of the vibration to 1/16".
[c] Polychloroprene/phenol formaldehyde adhesive (U.S. Patent No. 2,610,910).
[d] Nitrile rubber adhesive (British Patent No. 951,266).

What is claimed is:

1. A structure comprising (A) a perforated polymeric core material having an open area of from about 15% to about 75%, the perforations in said core material being substantially devoid of adhesive, said core material having bonded thereto an elastomeric adhesive having (1) a dynamic glass transition temperature of not more than the temperature to which the structure is to be used and (2) embedded therein a woven stress-raising member and (B) at least one metal layer bonded to the exterior of said adhesive.

2. A structure according to claim 1 wherein said stress-raising member is cloth.

3. A structure according to claim 1 wherein said stress-raising member is a metal screen.

4. A structure according to claim 1 wherein said stress-raising member is polymer coated fiber glass.

References Cited

UNITED STATES PATENTS

| | | | |
|---|---|---|---|
| 2,237,623 | 4/1941 | Ledwinka | 161—113 X |
| 2,355,608 | 8/1944 | Stieger | 181—33.1 |
| 2,595,047 | 4/1952 | Beranek | 181—33.1 |
| 2,887,173 | 5/1959 | Boschi | 161—112 X |
| 2,990,027 | 6/1961 | Sabine | 181—33.1 |
| 3,166,149 | 1/1965 | Hulse et al. | 181—33 |
| 2,304,263 | 12/1942 | Luty | 161—15 |
| 2,442,347 | 6/1948 | Eklund | 181—33.1 |
| 2,134,495 | 10/1938 | Woodall et al. | 161—113 |
| 2,966,954 | 1/1961 | Sabine | 181—33.1 |
| 3,232,371 | 2/1966 | Reichert et al. | 181—33.1 |
| 3,309,261 | 3/1967 | Schiller et al. | 161—190 |

FOREIGN PATENTS

| | | | |
|---|---|---|---|
| 901,979 | 7/1962 | Great Britain | 181—33.1 |

ROBERT F. BURNETT, Primary Examiner

R. H. CRISS, Assistant Examiner

U.S. Cl. X.R.

161—93, 95, 113; 181—33